US009100877B2

(12) United States Patent
Parron

(10) Patent No.: US 9,100,877 B2
(45) Date of Patent: Aug. 4, 2015

(54) COMMUNICATION DEVICES AND METHODS FOR CONTROLLING A COMMUNICATION DEVICE

(71) Applicant: Jerome Parron, Fuerth (DE)

(72) Inventor: Jerome Parron, Fuerth (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 199 days.

(21) Appl. No.: 13/756,635

(22) Filed: Feb. 1, 2013

(65) Prior Publication Data

US 2014/0219241 A1 Aug. 7, 2014

(51) Int. Cl.
*H04W 4/00* (2009.01)
*H04W 36/00* (2009.01)

(52) U.S. Cl.
CPC ................ *H04W 36/0022* (2013.01)

(58) Field of Classification Search
CPC ...... H04W 80/04; H04W 84/12; H04W 88/06
USPC .................. 370/252, 328, 331, 338, 401, 469
See application file for complete search history.

(56) References Cited

U.S. PATENT DOCUMENTS

| | | | | |
|---|---|---|---|---|
| 5,553,311 | A * | 9/1996 | McLaughlin et al. | ........... 710/64 |
| 2002/0181055 | A1* | 12/2002 | Christiansen et al. | ........ 359/159 |
| 2005/0249162 | A1* | 11/2005 | Kim et al. | ...................... 370/333 |
| 2008/0055085 | A1* | 3/2008 | Samboursky et al. | ...... 340/572.1 |
| 2008/0188224 | A1* | 8/2008 | Pani et al. | ...................... 455/436 |
| 2009/0059792 | A1* | 3/2009 | Itoh | ................................ 370/235 |
| 2012/0102131 | A1* | 4/2012 | Lin et al. | ........................ 709/207 |
| 2012/0170733 | A1* | 7/2012 | Chauvel et al. | ........... 379/142.17 |
| 2012/0257559 | A1* | 10/2012 | Kim et al. | ...................... 370/311 |

OTHER PUBLICATIONS

3GPP TS 24.008 V12.0.0, 3rd Generation Partnership Project; Technical Specification Group Core Network and Terminals; Mobile radio interface Layer 3 specification; Core network protocols; Stage 3 (Release 12), Dec. 2012, section 5.2.4, pp. 249-251.
3GPP TS 24.237 V11.5.0, 3rd Generation Partnership Project; Technical Specification Group Core Network and Terminals; IP Multimedia (IM) Core Network (CN) subsystem IP Multimedia Subsystem (IMS) Service Continuity; Stage 3 (Release 11), Dec. 2012, section 12, pp. 78-140.

* cited by examiner

*Primary Examiner* — Ricky Ngo
*Assistant Examiner* — Christine Ng

(57) ABSTRACT

A communication device may be provided. The communication device may include: a protocol stack of a communication protocol layer, the protocol stack including: a receiver configured to receive from a layer higher than the communication protocol layer an input signal; a transmitter configured to transmit to another communication device data based on the received input signal and configured to transmit to the higher layer information indicating a transmission state of the data.

25 Claims, 10 Drawing Sheets

COMMUNICATION DEVICES AND METHODS FOR CONTROLLING A COMMUNICATION DEVICE

TECHNICAL FIELD

Aspects of this disclosure relate generally to communication devices and methods for controlling a communication device.

BACKGROUND

With the introduction of single radio voice call continuity handover some services available over IP (Internet Protocol) networks (such as IMS (IP Multimedia Subsystem) voice service) can be continued over cellular circuit switched systems e.g. if the user moves to an area where the IP link cannot be maintained with a guaranteed quality of service. In this case, the session control needs to be seamlessly transferred from the IMS application (for example SIP (Session Initiation Protocol) based) to the circuit switched system call controller.

SUMMARY

A communication device may include: a protocol stack of a communication protocol layer, the protocol stack including: a receiver configured to receive from a layer higher than the communication protocol layer an input signal; and a transmitter configured to transmit to another communication device data based on the received input signal and configured to transmit to the higher layer information indicating a transmission state of the data.

A method for controlling a communication device may include: receiving in a protocol stack of a communication protocol layer an input signal from a layer higher than the communication protocol layer; transmitting data based on the received input signal from the protocol stack to another communication device; and transmitting to the higher layer information indicating a transmission state of the data.

A communication device may include: a protocol stack of a communication protocol layer, the protocol stack configured to receive an input signal from a higher layer, configured to transmit data to another communication device based on the received input layer, and configured to transmit to the higher layer information indicating a transmission state of the data.

A method for controlling a communication device may include: controlling a protocol stack of a communication protocol layer to receive an input signal from a higher layer; controlling the protocol stack to transmit data to another communication device based on the received input layer; and transmitting to the higher layer information indicating a transmission state of the data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
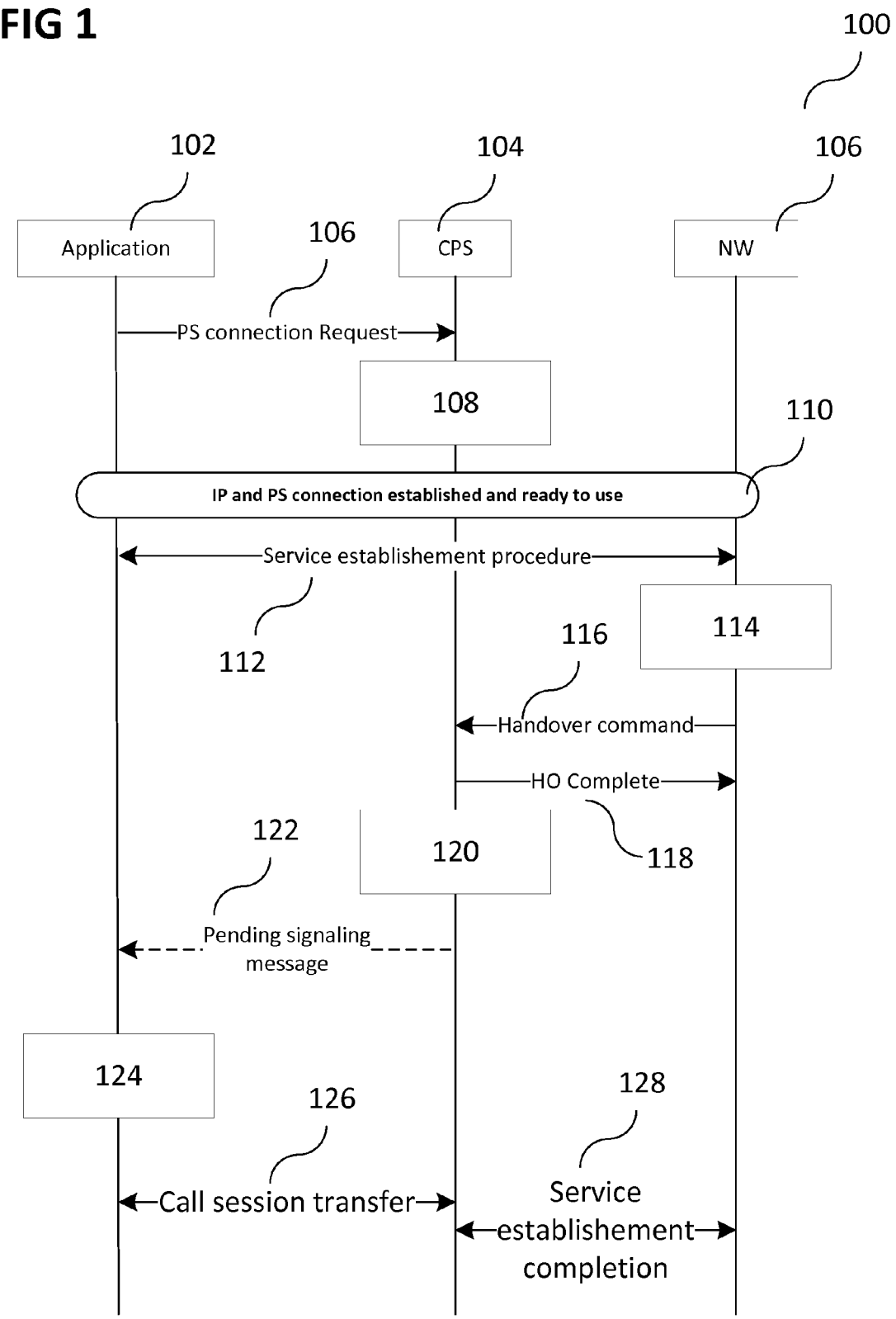
FIG. 1 shows a flow diagram illustrating a message flow with an analysis of content of IP data.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A communication device may be or may include a terminal device, which may also be referred to as communication end device or as end device) as referred to herein may be a device configured for wired communication, for example a desktop computer or laptop, or for wireless communication, for example a radio communication device. Furthermore, a radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The communication device may include a memory which may for example be used in the processing carried out by the communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Devices and methods may be provided for session transfer optimization from over IP application to circuit switched cellular systems.

With the introduction of single radio voice call continuity handover some services available over IP (Internet Protocol) networks (such as IMS (IP Multimedia Subsystem) voice service) can be continued over cellular circuit switched systems (for example GSM (Global System for Mobile Communications) or UMTS (Universal Mobile Telecommunications System)) e.g. if the user moves to an area where the IP link cannot be maintained with a guaranteed quality of service. In this case, the session control needs to be seamlessly transferred from the IMS application (SIP (Session Initiation Protocol) based) to the circuit switched system call controller.

The device and the network may locally manage the call session transfer. There may be no synchronization between the device and the network. During the session transfer, some call control signaling information sent over the IP connection (or in other words: an IP based connection; such as a SIP message) may not be transmitted due to suspension of the device physical layer. The signaling over IP may often be not acknowledged (for example UDP (User Datagram Protocol) based) at IP level and the "over IP" application such as IMS may be not aware that a signaling message has not been successfully sent. This may lead to a desynchronization between the IMS application in the device and the IMS server in the network regarding the call control state of the transferred session. After the call session transfer, the circuit switch call control entity in the device and the network may not be synchronized leading to a poor user experience such as longer session establishment or incorrect service setup or loss of audio.

The call session transfer from IMS to a circuit switched system using a single radio may not be fully solved today. The 3GPP (Third Generation Partnership Project) standard doesn't offer a generic mechanism to solve such an issue. Only one scenario (the case of transfer of UE terminated call in alerting state) is currently covered: in case the user accepts the incoming call, the UE shall resend a CONNECT message to the network after the session transfer to the circuit switched system independently if the 200OK (Connect) was already sent to the IMS network.

In currently used methods and devices, the IMS application may be not aware if a message, once posted on the IP stack, is well transmitted to the network or not. Consequently a procedure in transitory state may only be failed or restarted from the beginning in case of call control ownership transfer from one application to another application.

Device and methods may be provided which may provide that the call transfer even in transition state may be possible as the IMS application may be aware of the transmission status of its critical signaling message.

Devices and methods according to the current 3GPP standard may be covering only a single use case, but problems may occur in case of call-session transfer during call setup or with any signaling exchange during call setup or with related services (for example supplementary service, call conferencing and/or DTMF). Also the current solution may be based on "CONNECT" message redundancy (sent one time on IMS over IP and a second time on circuit switched system) which may be less efficient in terms of resource consumption.

Devices and methods may be provided which may introduce an IP data analyzer to check for pending IP application signaling message in case of session transfer from an IMS application to a circuit switch call controller.

A communication device may provide data to be sent from the communication device to another communication device (for example to be sent wirelessly or via a wired connection) to a protocol stack. This protocol stack may then transmit the data using a communication protocol to the other communication device. It will be understood that a protocol stack of a communication protocol layer may include a circuit (or a plurality of circuits) configured to perform processing to send the data from the communication protocol layer including lower layers (for example a protocol stack of a communication protocol layer may provide all layers of the communication protocol including and below the communication protocol layer). A protocol stack may be a protocol stack circuit.

For example, in case of IMS signaling transfer over LTE, the following layers may be involved: TCP or UDP, IP, and the following layers of the cellular protocol stack. The following layers may be part of the cellular protocol stack: PDCP (Packet Data Convergence Protocol), RLC (Radio Link Control; which may provide transfer of data in TM (Transparent Mode), UM (Unacknowledged Mode) or AM (acknowledge Mode, including indication of successful delivery of upper layers PDUs)), and MAC (Medium Access Control, which may manage data transfer and radio resource allocation). The following services may be provided by PDCP to upper layers: transfer of user plane data; transfer of control plane data; header compression; ciphering; and integrity protection. The following service may be expected by PDCP from lower layers: acknowledged data transfer service, including indication of successful delivery of PDCP PDUs; unacknowledged data transfer service; in-sequence delivery, except at re-establishment of lower layers; and duplicate discarding, except at re-establishment of lower layers.

Once the handover in access stratum from packet switch to circuit switch is performed, the IP data stored in the modem buffers may be analyzed. In an example, the IP analyzer may look for non transmitted IP data packet and may provide it back to the application, and the application may itself analyze the content for the message. In another example, the application may provide a "search" pattern to the IP analyzer. The IP analyzer may provide back only the message (for example the IP packet) matching the pattern. It will be understood that the modem buffer may include or may be an IP stack buffer or any cellular protocol stack buffer. The IP analyzer may get feedback from lower layer if a message has been successfully transmitted or not. It may also get input from lower protocol on the reliability of the transmission, for example based on the retransmission protocol used (for example MAC (Media Access Control), HARQ (Hybrid automatic repeat request) or RLC (Radio Link Control) ACK (acknowledgement)). For example, the IP analyzer may provide also a reliability indicator to the application in case of "successful" transmission of the data. If application signaling messages (such as SIP signaling) are detected, the IMS application may be informed and then may determine the exact state of the call session(s) to be transferred. Consequently, the IMS application may be able to indicate the exact state of the call session(s) to the circuit switch call controller. The circuit switch call controller may then be able to continue the signaling for the current session from the exact point where it was stopped, even in transition phase.

This may allow an application working over IP connection to be informed of non-transmitted signaling critical message during a call session transfer to circuit switched system.

The devices and methods may provide that the call session transfer from IMS to circuit switch is accurate, which may reduce the risk of bad synchronization of the network. Consequently, any user request may have a better chance to be successfully performed, offering a better user experience.

The devices and methods may allow an easier management for the circuit-switched call controller as the exact call state is known, allowing to directly continue a session without having to handle additional message retransmission or error scenarios. The execution of the procedure in transition state may be realized on the basis of the existing 3GPP standard, and optionally may further be improved by making changes to the 3GPP standard.

The devices and methods may offer a higher efficiency in the signaling exchange with the network as message redundancy is avoided.

The devices and methods may be applicable for all procedures (for example voice/video call session signaling, and/or supplementary services) and may not require additional signaling between device and network. Devices and methods may be provided so that the initial call controller may get an accurate status on which message has actually been sent (successfully with potential uncertainty based on acknowledge mechanism reliability of lower layers), for example been sent from the cellular protocol stack.

Consequently, the call session signaling state (for example the state or status of a communication session, for example a call session) may be transferred to another call control to the device with the handover procedure. The second call control may then continue the call session signaling from the exact point indicated by the first call control. From this standpoint, signaling with the network is continued and may be well defined, in other words may be well-specified. Furthermore, error handling may be provided. To support this, clarification in 3GPP may be provided to indicate that such transition is possible.

According to various devices and methods, a new signaling to the network may be specified, where after the handover the UE may explicitly signal its state or standpoint to help the network successfully continue the procedure. This may be specified in 3GPP.

Devices and methods may be based on the look up and retrieval of non-transferred session control messages embedded in IP packets (or any other kind of packet from another protocol layer) in case of handover from a packet switched connection to circuit switched connection. This information may be used to have an accurate call control transfer from an IMS application to a circuit switched system call controller. It may then be used as well to retransmit non-acknowledged signaling information.

Devices may be provided which may include a packet buffer analyzer that may be able to find application signaling messages in IP/L2 data buffer. The analysis of the pending data in an internal buffer may be performed by any one of multiple components (the component performing the analysis may be referred to as a message analyzer, for example a control message analyzer, which may be provided for example in the cellular protocol stack; for example the cellular protocol stack may analyze the stored data which have not been transmitted successfully; or for example a separate module may analyze the stored IP packet data; or for example the stored data may be sent back to the sender application (for example an IMS component), so that then the application can perform itself the analysis). To ease the application analysis, a reliability indicator may be provided in case of successful transmission (for example for the last or few last transmitted message). To ease the IP data analysis, patterns may be provided by the application to identify the critical signaling message. The analysis mechanism may be configurable, the application may indicate to only perform IP data analysis in case of session ownership transfer from the application to the circuit switched system call controller.

Devices and methods may be provided which may provide the report of the stored signaling message present in the data buffer to the requesting application. The trigger to send the report may be configurable, for example the trigger may be set off on the completion of a SRVCC (or SR-VCC; single radio voice call continuity) handover from IMS to circuit switched system.

The reported information may be used to determine the actual transition state of service sessions and to enhance the coordination between different session controller (such as IMS and circuit switched system).

FIG. 1 shows a flow diagram 100 illustrating a method for analysis of the IP data. An application 102 may communicate with a CPS (cellular protocol stack) 104 and a network NW 106. In 106, the application 102 may send a PS (packet switched) connection request 106 to the CPS NAS 104. In 108, the CPS NAS 104 may establish a PS bearer. In 110, the IP and PS connection may be established and ready to use. 112 may indicate the service establishment procedure between the application 102 and the NW 106. In 114, a loss of LTE (Long Term Evolution) coverage may occur, and the NW 104 may trigger mobility to GSM or UMTS. In 116, the NW 106 may send a hand over (HO) command to the CPS 104. The handover command may be processed by the access stratum. It will be understood that CPS 104 may include both AS (access stratum) and NAS (non access stratum). If the handover is successful, the NAS layer of the cellular protocol stack and the IMS may synchronize themselves to perform the call session transfer. In 118, HO may be complete. 120 may indicate IP data residing in a buffer or analyzed IP data or IP data sent to analysis to the application. The NAS layer may be informed by the access stratum that the handover from RRC layer (Radio resource control) is successful. Here the call session transfer may start. The NAS layer may inform the IMS component that an SRVCC procedure is ongoing and that the call session shall start. The IMS, NAS layer or the access stratum may then inform the IP analyzer or any component doing this role to provide back the non transmitted IP frame or directly the application message, for example if filtering patterns have been provided by the application to the IP analyzer. Then the call session transfer may actually be done. 122 may indicate a pending signaling message from the CPS NAS 104 to the application 102. The application 102, the CPS NAS 104, or the IP analyzer, which may reside in the NAS or access stratum layer or IP layer or another layer (which may be implementation dependent), and/or the NW 106 may perform a protocol header analysis in the content of IP data, for example search for SIP signaling, RTP signaling, and/or a DTMF event. In 124, the application may update a service session status based on IP data analysis; if some signaling message were not transmitted, the application may revise the session status accordingly. In 126, the application 102 and the CPS NAS 104 may perform a call session transfer. 128 may indicate a service establishment completion between the CPS NAS 104 and the NW 106.

Figure 2:
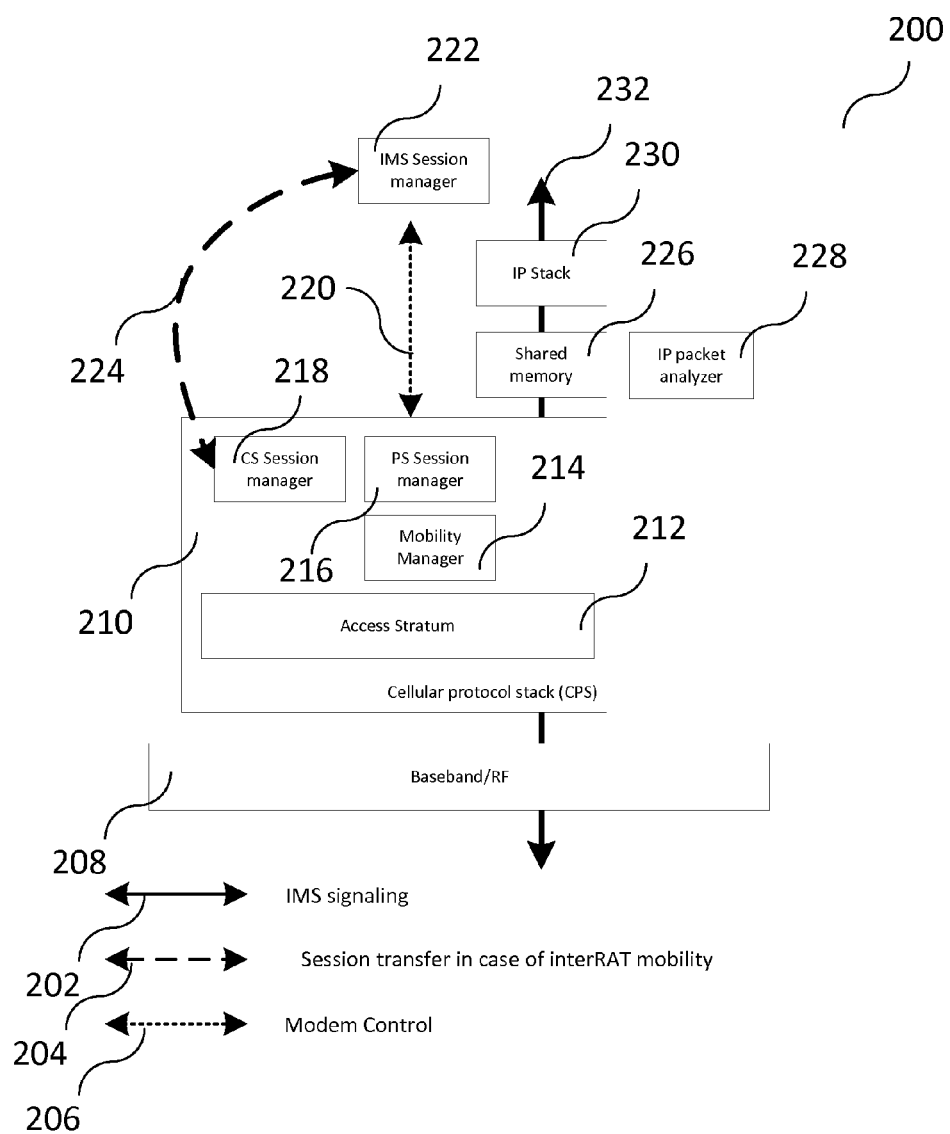
FIG. 2 shows a device on which various methods may be used.

FIG. 2 shows a diagram 200 illustrating a platform architecture. IMS signaling may be indicated by a solid line arrow 202. Session transfer in case of inter RAT (radio access technology) mobility may be indicated by a dashed line arrow 204. Modem control may be indicated by a dotted line arrow 206. A baseband/RF (radio frequency) 208 may be provided. A CPS (cellular protocol stack) 210 may include an access stratum 212, a CS (circuit switched) session manager 218, a PS (packet switched) session manager 216, and a mobility manager 214. An IMS session manager 222 may be provided. It will be understood that IMS and NAS may be provided on different processors. Shared memory 226 and an IP stack 230 may be provided. Furthermore, an IP packet analyzer 228 may be provided. IMS signaling from the IP stack 230 down to the baseband/RF is indicated by arrow 232. Session transfer between the IMS session manager 222 and the CS session manager 218 is indicated by arrow 224. Modem control between the IMS session manager 222 and the CPS 210 is indicated by arrow 220. FIG. 2 shows an incomplete representation of a commonly used platform. Only the component relevant to the devices and methods provided are shown. It does not indicate as well on which hardware the respective portions are located.

The IMS session manager 222 may be in charge of handling (for example establishment, control, release) IMS services and doing the necessary signaling exchange with the network (for example using SIP protocol, but other may be used).

The CS session manager 218 may refer to the Call Controller (CC) and Mobile network manager (MN) in the NAS layer of the cellular protocol stack and may be handling all the signaling with the network for Circuits switch call/session/service.

The PS session manager 216 (SM/ESM) handle the PS session on the packet switch domain. It may handle the signaling for PDP (packet data protocol) context management/ PDN (Packet Data Network) connectivity.

The Mobility manager 214 (MM) in the NAS layer may handle all the procedure related to mobility and handle the corresponding signaling with network.

The access stratum 212 may include multiple components such as radio resource controller and all component dealing with the transmission protocol such as PDCP/RLC/MAC and may allow to send and received user data or signaling data to the network. It may manage all the radio resources.

Figure 3:
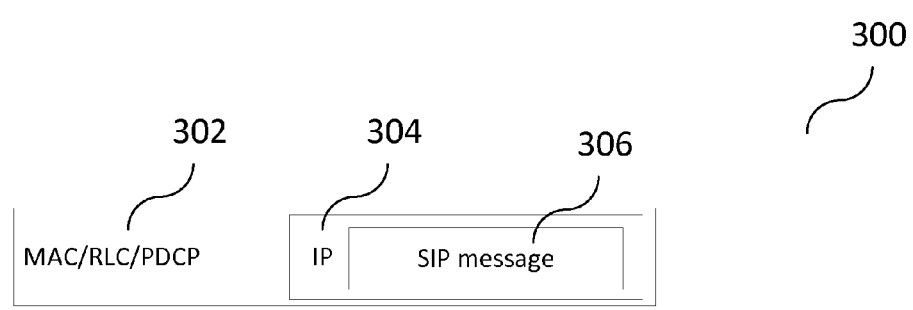
FIG. 3 shows a diagram illustrating a transmitted message.

FIG. 3 shows an illustration of a transmitted message 300. A SIP message 306 may be included in an IP message 304. For example, the SIP message 306 may be encapsulated in a TCP (Transmission Control Protocol) or UDP message, which may be encapsulated in the IP message 304. The IP message 304 may be included in a MAC (Media Access Control) message, a RLC (Radio Link Control) message, or a PDCP (Packet Data Convergence Protocol) message 302.

It will be understood that although various example are described for a cellular protocol stack (CPS), in each of the examples the CPS may be any protocol stack, for example a WLAN (wireless local area network) protocol stack or a Bluetooth protocol stack, for example any protocol stack of a protocol which provides a transport channel, for example for IP communication.

Figure 4:
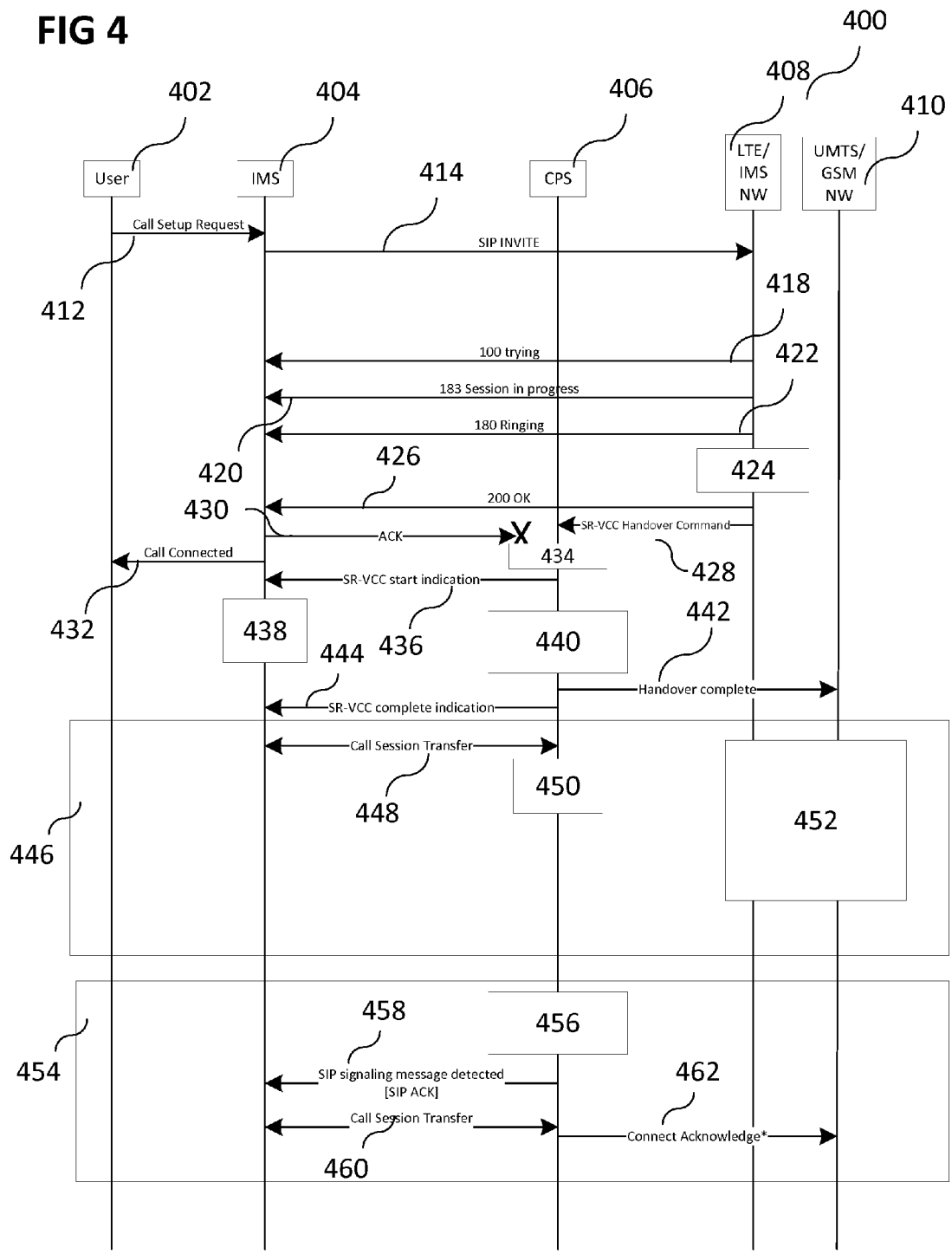
FIG. 4 shows a flow diagram illustrating a call session transfer of a mobile originated call.

FIG. 4 shows a flow diagram 400 illustrating a session transfer of UE originated call under establishment. In the call session transfer of a mobile originated call illustrated in FIG. 4, communication between a user 402 of a communication device, an IMS application 404 (which may also be referred to as "IMS" 404) of the communication device, a CPS 406 of the communication device, an LTE or IMS NW 408, and a UMTS or GSM NW 410 is shown. It will be understood that the LTE network and the IMS network may be separate networks. The NAS layer entity of the CPS may talk to the MME in the LTE (EPC (evolved packet core)) core network, but the IMS layer may talk with its peer in the IMS core network. For ease of representation, LTE and IMS may be shown in the figures as to be combined in one box. But the different signaling message do not reach the same entity in the network. In 412, the user 402 may send a cell setup request to the IMS 404. The IMS 404 may send a SIP INVITE 414 to the LTE/IMS NW 408. The LTE/IMS NW 408 may send a 100 trying message 418 to the IMS 404. The LTE/IMS NW 408 may send a 183 Session in progress message 420 to the IMS 404. The LTE/IMS NW 408 may send a 180 Ringing message 422 to the IMS 404. In 424, it may be assumed that LTE coverage may not be good and the NW may initiate a handover to GSM. In 426, the LTE/IMS NW may send a 200 OK signal to the IMS 404. In 428, the LTE/IMS NW 408 may send a handover command to initiate a SR-VCC procedure to the CPS 406. The IMS 404 may send an ACK signal 430 to the IMS network via the CPS 406 (in other words, the IMS 404 may send an ACK to the IMS network by using the transmission protocol of the cellular protocol stack), but this signal may be assumed to reach the network and may remain in one of the transmission buffers of the user plane (for example in the CPS 406 or above) like indicated by an "X" in FIG. 4, for example because the PHY (physical layer) is suspended in 434. The "X" may mean that the message is not successfully transmitted to the network or that no indication from the network (for instance HARQ ACK in MAC layer) has been received (which would indicate a successful transmission). The IMS 404 may send a call connected signal 432 to the user 402. The CPS 406 may send a SR-VCC start indication signal 436 to the IMS 404. The NAS layer of the CPS may inform the IMS that a SRVCC procedure is initiated and that the control of the call session may be transferred to CPS. In 438, for IMS application, a call setup may be successfully performed. The IMS application may not be aware that the SIP ACK has not been successfully transmitted, because after posting the message to the IP stack, it may not be informed that the packet has well been transmitted. However the message may be blocked in the lower layer (for example in 440). When the handover is started, the physical layer of the source RAT (radio access technology) may be suspended to allow the synchronization on the target RAT. Consequently no message exchange may be possible for the network. The CPS 406 may send a handover complete signal 442 to the UMTS/GSM NW 410. The CPS 406 may send a SR-VCC complete indication 444 to the IMS 404 to trigger the transfer of the control of the call.

Processing as shown in box 446 may indicate a problem due to processing according to the present standard. In 448, a call session transfer signal may be exchanged between the IMS 404 and the CPS 406. In 450, the CPS may be informed of an active call session. 452 may indicate that the IMS NW 408 never receives an ACK and may not determine if the UE has received or not the 2000K (Connect) 426. The network may consider the service has not successfully connected (after some timer expiry) that may lead to the release of the call session. In case 200 OK has not been received by the UE, on the contrary, the network may think the call is connected, but the UE may still wait for the connect indication. However, this is just an example for a behavior. The actual behavior may depend on the network implementation. Either the NW may rely on the ACK and then may take some decision in case the ACK is not received, or the network may not rely on the ACK and then may take decision independently if the UE get the 2000K or not. Thus, the network behavior may be unknown regarding the call transfer to the GSM/UMTS MSC (mobile switching center). The UE and the NW may not be synchronized. For example, this may give the impression for the user that a call is successfully connected whereas it is not.

Processing illustrated in box 454 illustrates processing provided by the devices and methods which may be provided (for example as described in FIG. 9 to FIG. 12), for example with an IP data analyzer. 456 illustrates that pending data in IP/CPS buffer is analyzed. If SIP signaling message are detected, feedback may be provided. In 458, the CPS 406 may send a SIP signaling message detected, for example a SIP ACK message, to the IMS 404. Once the handover is complete from access stratum perspective, the call control may be transferred from IMS to CPS NAS. To do it in a reliable matter, the IP analyzer (wherever its location) may provide to the IMS component the potential pending IP packet or SIP signaling message (both implementation may be possible). As an example, the IP analyzer may be a part of CPS and may detect in the transmission buffer an IP packet containing a SIP message 2000K. This may indicate then the pending 200 OK to IMS component. The IMS may then determine the accurate call state and may proceed with the call session transfer. 460 may indicate a call session transfer signal exchanged between the IMS 404 and the CPS 406, which may provide that a call is connected, and that a connect acknowledge is to be sent. The UE behavior is now based on more accurate call transition state. If 2000K received, but ACK is not successfully sent, the UE may send the Connect Acknowledge to avoid any ambiguity on network side. It may also ensure that the UE doesn't believe to be in connected state whereas the network still consider the UE is alerting state. (Indeed otherwise, the UE may receive a connect indication from network whereas it is already connected potentially considered as abnormal scenario). In 462, a connect acknowledge may be sent from the CPS 406 to the UMTS/GSM NW 410. 460 and 462 may be new behavior and may be described in 3GPP.

Figure 5:
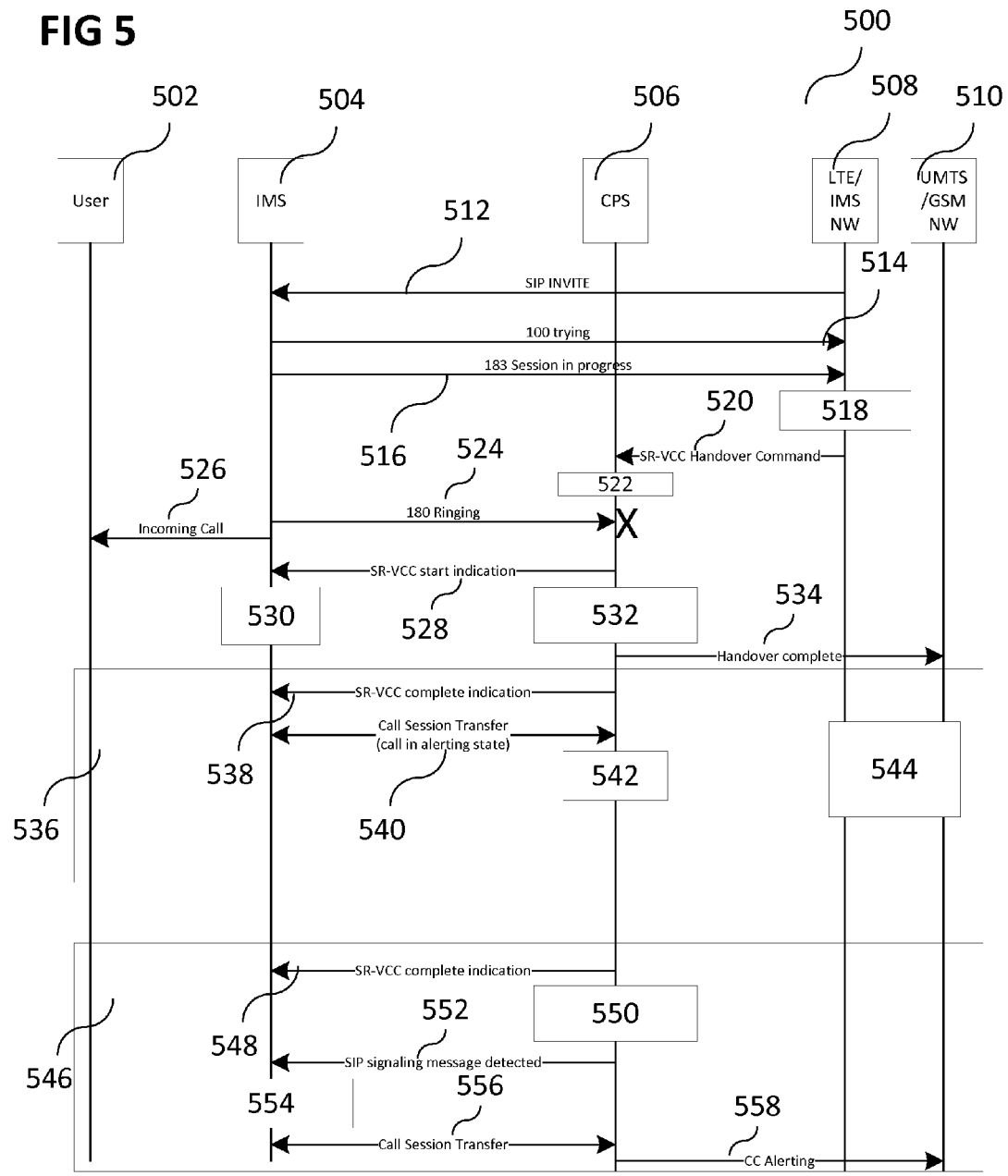
FIG. 5 shows a flow diagram illustrating a call session transfer conflict in an altering phase.

FIG. 5 shows a flow diagram 500 illustrating a session transfer of UE terminated call under establishment (pre-alerting state). FIG. 5 illustrates a SRVCC procedure initiated during call session in alerting phase (mobile terminated). In FIG. 5, communication between a user 502 of a communication device, an IMS application 504 (which may also be referred to as "IMS" 504), a CPS 506 of the communication device, an LTE and IMS NW (network) 508, and a UMTS or GSM NW 510 is shown. It will be understood that the LTE network and the IMS network may be separate networks. The NAS layer entity of the CPS may talk to the MME in the LTE (EPC (evolved packet core) core network, but the IMS layer may talk with its peer in the IMS core network. For ease of representation, LTE and IMS may be shown in the figures as to be combined in one box. But the different signaling message do not reach the same entity in the network. In 512, the LTE/IMS NW 508 may send a SIP INVITE signal to the IMS 504. In 514, the IMS 504 may send a 100 trying signal to the IMS NW 508. In 516, the IMS NW 508 may send a 183 session in progress signal to the IMS 504. It may be assumed that in 518, the LTE coverage is not good and the NW may initiate a handover to GSM. In 520, the LTE/IMS NW 508 may initiate a SR-VCC handover and send a handover command to the CPS 506. It may be assumed that in 522, the PHY layer is suspended. In 524, the IMS 504 may send a 180 ringing signal to the IMS NW 508, but like indicated by an "X" in FIG. 5, this signal may not arrive at the network; for example, the message sent by the IMS component 504 on the communication device may not reach the network. In 526, the IMS 504 may send an incoming call signal to the user 502. In 528, the CPS 506 may send a SR-VCC start indication to the IMS 504. Block 530 may indicate that for IMS, the call is in alerting state. Block 532 may indicate that the IP packet including the SIP message 180 Ringing 524 is blocked in IP buffer or cellular protocol stack PS buffer due to the handover procedure. In 534, the CPS 506 may send a handover complete signal to the UMTS/GSM NW 510.

Processing as shown in box 536 may indicate a problem due to processing according to the present standard. In 538, the CPS 506 may indicate to the IMS 504 that the handover procedure is complete and that the control of the call session shall be transferred from IMS 504 to CPS 506. 540 indicates a call session transfer signal exchanged between the IMS 504 and the CPS 506 (which may indicate that the call is in alerting stage). Block 542 may indicate that the CPS 506 is informed of an MT (mobile terminated) call in alerting state. Block 544 may indicate that the IMS NW never receives 180 Ringing 524 and may consider the call is not yet in alerting phase and may drop the service after the call session transfer. The UE and the NW may not be synchronized. The call may be maintained for some time but with unpredictable behavior.

Processing illustrated in box 546 illustrates processing provided by the devices and methods which may be provided (for example as described in FIG. 9 to FIG. 12), for example with an IP data analyzer. In 548, the CPS 506 may send a SR-VCC complete indication to the IMS 504. In 550, pending data in IP/CPS buffer may be analyzed. If SIP signaling message are detected, feedback may be provided. In 552, a signal may be sent from the CPS 506 to the IMS 548, indicating that a SIP signaling message is detected, for example a 180 ringing message. It will be understood that the signal sent in 552 may be sent from another component outside the protocol stack (for example dependent on the location of the IP analyzer). In 554, the IMS 504 may, based on UE/NW capability, decide to directly release the call, or provide the exact call state for the transfer to circuit switched. In 556, a call session transfer signal 556 may be exchanged between the IMS 504 and the CPS 506. In 558, the CPS 506 may send a CC (call control) alerting signal to the UMTS/GSM NW. The devices and methods provided may allow to transfer call even in transition state.

For example, it may be clarified in 3GPP that the UE shall ensure that a message has been successfully transmitted before proceeding with the call session transfer; for example, that in case 180 Ringing is not sent, then the UE shall drop the call or alternatively send again a CC (call continuity) altering message.

Figure 6:
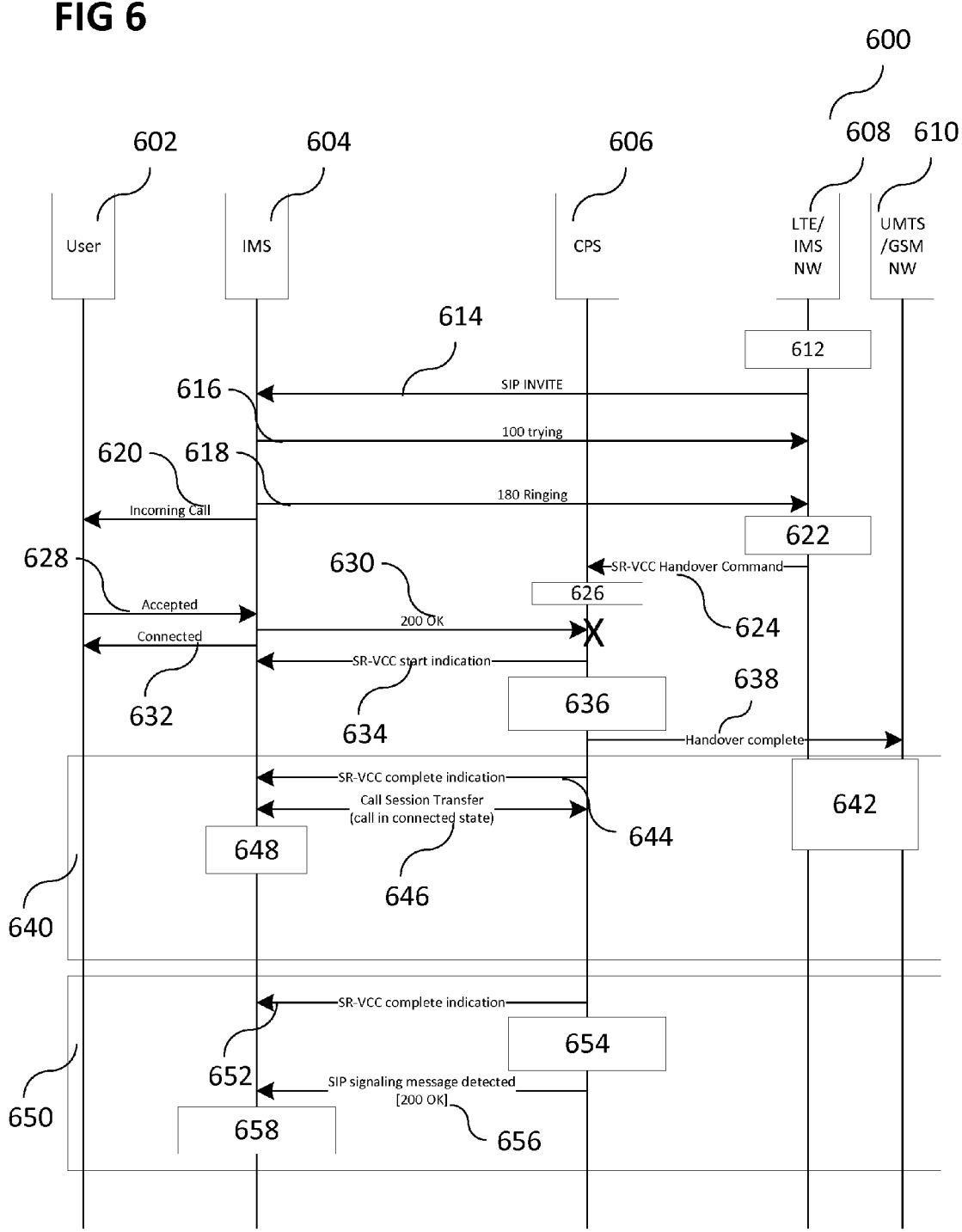
FIG. 6 shows a flow diagram illustrating a call session transfer conflict in a connecting phase.

FIG. 6 shows a flow diagram illustrating a session transfer of UE terminated call under establishment (for example in alerting state). FIG. 6 illustrates a call session transfer conflict in connecting phase (for example mobile terminated). In FIG. 6, communication between a user 602 of a communication device, an IMS application 604 (which may also be referred to as "IMS" 604) of the communication device, a CPS 606 of the communication device, an LTE or IMS NW 608, and a UMTS or GSM NW 610 is shown. It will be understood that the LTE network and the IMS network may be separate networks. The NAS layer entity of the CPS may talk to the MME in the LTE (EPC (evolved packet core) core network, but the IMS layer may talk with its peer in the IMS core network. For ease of representation, LTE and IMS may be shown in the figures as to be combined in one box. But the different signaling message do not reach the same entity in the network. Block 612 may indicate that the IMS network does not support SRVCC for call in alerting state whereas the communication device may support. In 614, the IMS NW 608 may transmit a SIP INVITE signal to the IMS 604. In 616, the IMS 604 may transmit a 100 trying signal to the IMS NW 608. In 618, the IMS 604 may transmit a 180 Ringing signal to the IMS NW 608. In 620, the IMS 604 may transmit an incoming call signal to the user 602. It may be assumed that in 622, the LTE coverage may be not good and that the NW may initiate handover to GSM. In 624, the LTE NW may transmit a SR-VCC handover command to the CPS 606. It may be assumed that in 626, the physical layer may be suspended. In 628, the user 602 may transmit an accepted signal to the IMS 604. In 630, the IMS 604 may transmit an 200 OK signal to the CPS 606, which however may not arrive (in other words: is not successfully transmitted to the network), like indicated by "X" in FIG. 6. In 632, the IMS 604 may transmit a connected signal to the user 602. In 634, the CPS 606 may transmit a SR-VCC start indication to the IMS 604. Block 636 may indicate that the IP packet containing the SIP message 200 OK 630 is blocked in IP buffer or cellular protocol stack PS buffer due to the handover procedure. In 638, the CPS 606 may transmit a handover complete signal to the UMTS/GSM NW 610.

Processing as shown in box 640 may indicate a problem due to processing according to the present standard. In 644, the CPS 606 may transmit a SR-VCC complete indication to the IMS 604. 646 may indicate an exchange of a call session transfer signal, which may indicate that the call is in connected state. Block 642 may indicate that the IMS NW never receives 200 OK and considers the call as not successfully connected and may drop the call. Block 648 may indicate that from UE perspective, the call is in connected state. The UE and the NW may not be synchronized. The user may believe that the call is active, but the call may be dropped from network side. The call may be maintained for some time but with unpredictable behavior.

Processing illustrated in box 650 illustrates processing provided by the devices and methods which may be provided (for example as described in FIG. 9 to FIG. 12), for example with an IP data analyzer. In 652, the CPS 606 may transmit a SR-VCC complete indication to the IMS 604. In 654, pending data in the IP/CPS buffer may be analyzed. If SIP signaling message is detected, feedback may be provided. In 656, the CPS 606 (or the IP analyzer, which may be located in the CPS) may send a signal indicating that a SIP signaling message is detected (200 OK) to the IMS 604. In 658, the IMS may, based on UE/NW capability, decide to directly release the call with specific error cause, for example to avoid unexpected behavior to user.

Figure 7:
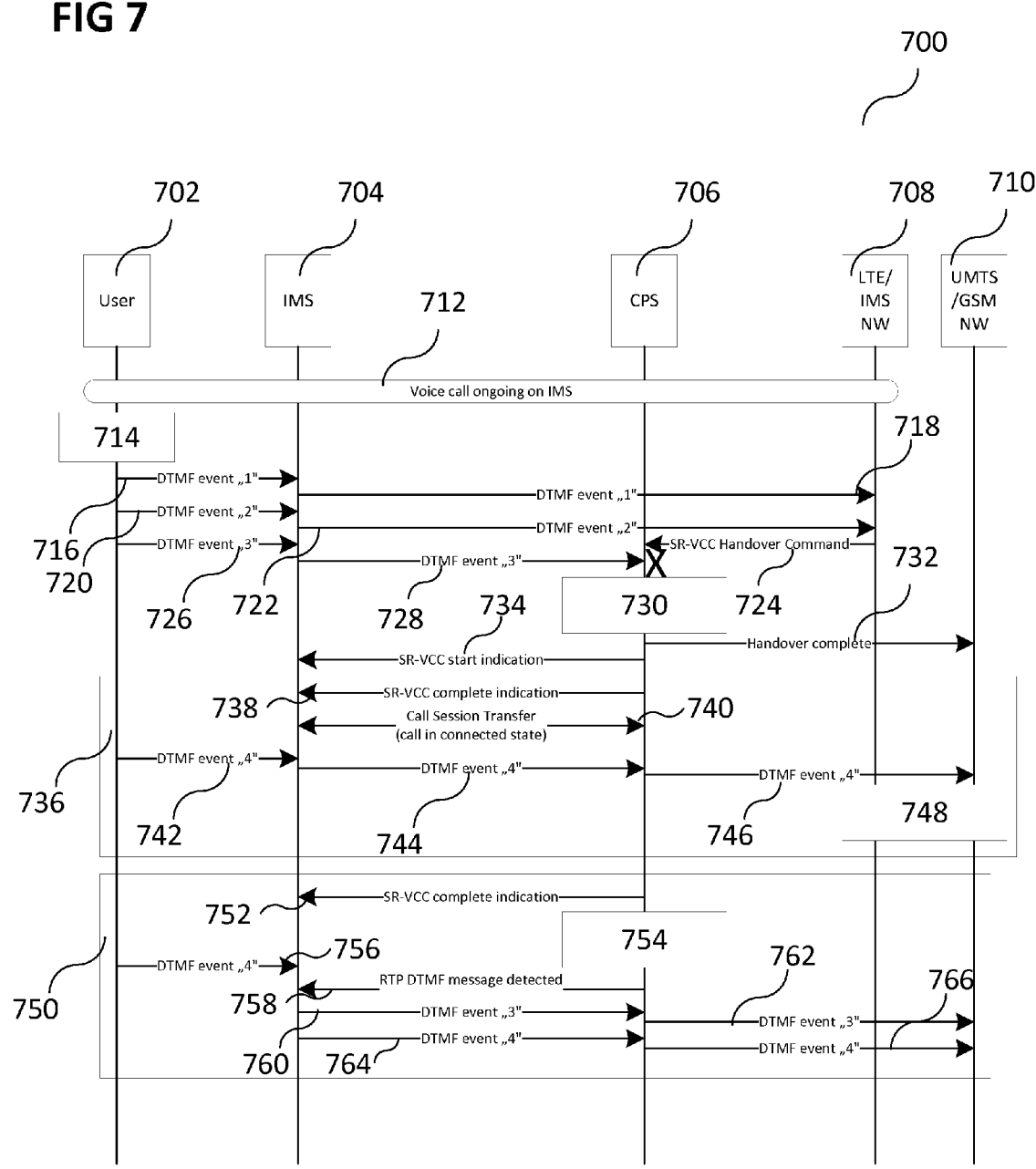
FIG. 7 shows a flow diagram illustrating a conflict in a DTMF (Dual-tone multi-frequency signaling) sequence sending.

FIG. 7 shows a flow diagram 700 illustrating sending a DTMF sequence sending session transfer. In FIG. 7, a communication between a user 702 of a communication device, an IMS application 704 (which may also be referred to as "IMS" 704) of the communication device, a CPS 706 of the communication device, an LTE and IMS NW 708, and a UMTS or GSM NW 710 is shown. It will be understood that the LTE network and the IMS network may be separate networks. The NAS layer entity of the CPS may talk to the MME in the LTE (EPC (evolved packet core) core network, but the IMS layer may talk with its peer in the IMS core network. For ease of representation, LTE and IMS may be shown in the figures as to be combined in one box. But the different signaling message do not reach the same entity in the network. In 712, a voice call may be ongoing on IMS. In 714, a user may press a series of keys, for instance to give a PIN (personal identification number). In 716, the user 702 may send a DTMF event "1" signal to the IMS 704. In 718, the IMS 704 may send a DTMF event "1" to the LTE/IMS NW 708. In 720, the user 702 may send a DTMF event "2" signal to the IMS 704. In 722, the IMS 704 may send a DTMF event "2" to the LTE/IMS NW 708. In 724, the LTE/IMS NW 708 may send a SR-VCC handover command to the CPS 706. In 726, the user 702 may send a DTMF event "3" signal to the IMS 704. In 728, the IMS 704 may send a DTMF event "3" to the CPS 706, but the signal may not be transmitted successfully from the CPS 706 to the network, like indicated by "X" in FIG. 7. For example, the IMS 704 may post the message to the IP stack and the message shall be transmitted by the CPS 706, but this is prevented by the start of the handover procedure. Block 730 may indicate that the IP packet containing the RTP DTMF tone is blocked in IP buffer or cellular protocol stack PS buffer due to the handover procedure. In 732, the CPS 706 may send a handover complete signal 732 to the UMTS/GSM NW 710. In 734, the CPS 706 may send a SR-VCC start indication to the IMS 704.

Processing as shown in box 736 may indicate a problem due to processing according to the present standard. In 738, the CPS 706 may send a SR-VCC complete indication to the IMS 704. In 740, a call session transfer signal (indicating that the call is in connected state) may be exchanged between the IMS 704 and the CPS 706. In 742, the user 702 may send a DTMF event "4" signal to the IMS 704. In 744, the IMS 704 may send a DTMF event "4" to the CPS 706. In 746, the CPS 706 may send a DTMF event "4" signal to the UMTS/GSM NW 710. Block 748 may indicate that the DTMF sequence is truncated.

Processing illustrated in box 750 illustrates processing provided by the devices and methods which may be provided (for example as described in FIG. 9 to FIG. 12), for example with an IP data analyzer. In 752, the CPS 706 may send a SR-VCC complete indication to the IMS 704. In 754, pending data in the IP/CPS buffer may be analyzed. If SIP signaling message is detected, feedback may be provided. In 756, the user 702 may send a DTMF event "4" signal to the IMS 704. In 758, the CPS 706 may send a signal indicating that a DTMF message is detected to the IMS 704. In 760, the IMS 704 may send a DTMF event "3" to the CPS 706. In 762, the CPS 706 may send a DTMF event "3" signal to the UMTS/GSM NW 710. In 764, the IMS 704 may send a DTMF event "4" to the CPS 706. In 766, the CPS 706 may send a DTMF event "4" signal to the UMTS/GSM NW 710.

Figure 8:
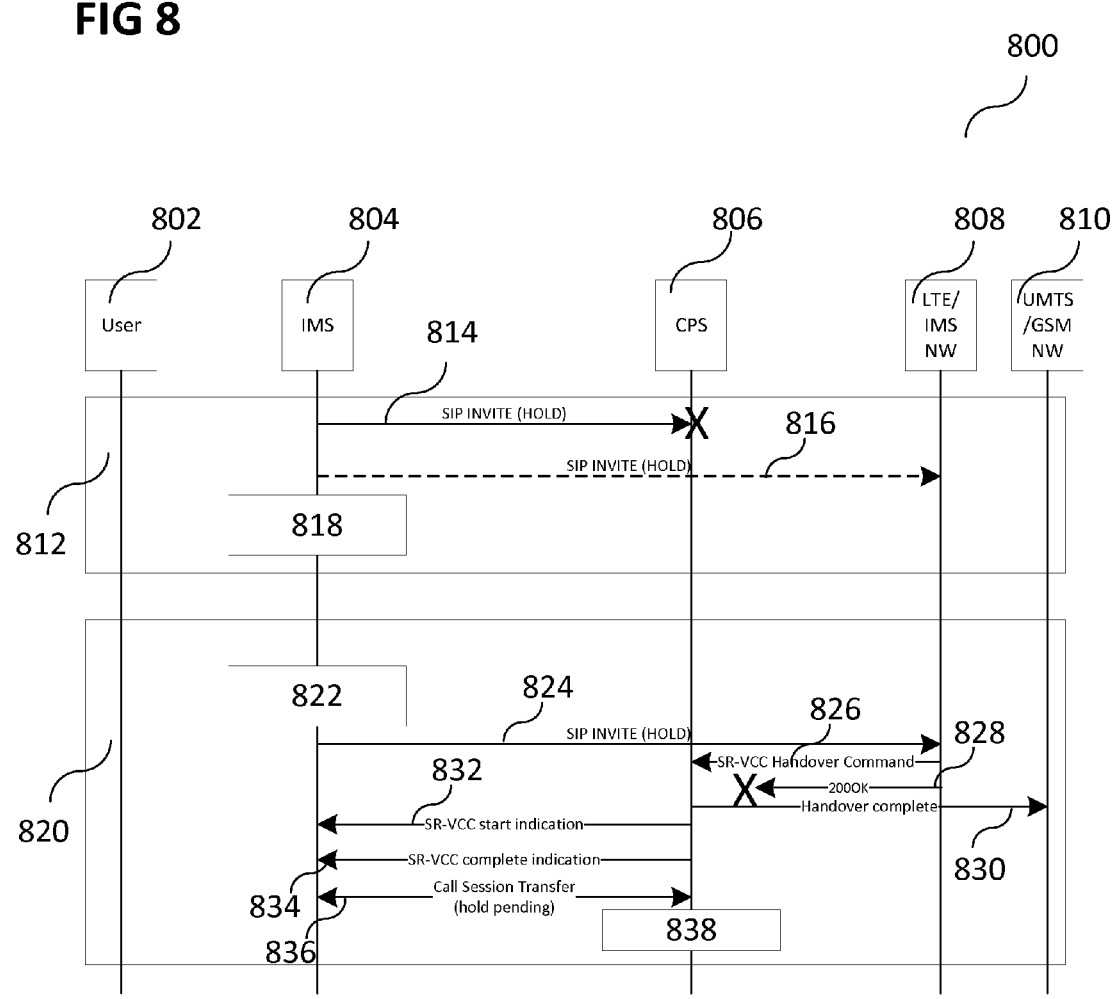
FIG. 8 shows a flow diagram illustrating a call session transfer conflict in a call hold.

FIG. 8 shows a flow diagram 800 illustrating a session transfer during supplementary service "call hold" procedure. In FIG. 8, a communication between a user 802 of a communication device, an IMS application 804 (which may also be referred to as "IMS" 804) of the communication device, a CPS 806 of the communication device, an LTE and IMS NW 808, and a UMTS or GSM NW 810 is shown. It will be understood that the LTE network and the IMS network may be separate networks. The NAS layer entity of the CPS may talk to the MME in the LTE (EPC (evolved packet core) core network, but the IMS layer may talk with its peer in the IMS core network. For ease of representation, LTE and IMS may be shown in the figures as to be combined in one box. But the different signaling message do not reach the same entity in the network.

Processing as shown in box 812 may indicate a problem due to processing according to the present standard. In 814, the IMS 804 may send a SIP INVITE (HOLD) signal to the CPS 806, but this signal may not be transmitted successfully from the CPS 806 to the network, like indicated by "X" in FIG. 8. Alternatively, in 816, the IMS 804 may send a SIP INVITE (HOLD) signal to the LTE/IMS NW 808. Block 818 indicates that the IMS application is not able to determine if HOLD has been sent or not. In case of SRVCC, the procedure shall be restarted from beginning or considered as failed.

Processing illustrated in box 820 illustrates processing provided by the devices and methods which may be provided (for example as described in FIG. 9 to FIG. 12), for example with an IP data analyzer. Block 822 may indicate that with IP data analyzer, the IMS application may determine if HOLD has well been transmitted or not. In 824, the IMS 804 may send a SIP INVITE (HOLD) signal to the IMS NW 808. In 826, the LTE NW 808 may transmit a SR-VCC handover command to the CPS 806. In 828, the IMS NW 808 may send a 200 OK signal to the CPS 806, but the signal may not arrive at the radio communication device (in other words, neither at the CPS 806 nor at the IMS 804), like indicated by "X" in FIG. 8. In 830, the CPS 806 may send a handover complete signal to the UMTS/GSM NW 810. In 832, the CPS 806 may send a SR-VCC start indication to the IMS 804. In 834, the CPS 806 may send a SR-VCC start indication to the IMS 804. In 836, the IMS 804 and the CPS 806 may exchange a call session transfer signal (which may indicate hold pending). Block 838 may indicate waiting for hold acknowledge.

Devices and methods may be provided for having an accurate transfer of a call controller from an IP based application to a circuit switch application.

A reliability factor in case of successful transmission just before a handover procedure may be communicated. In such case, the IP analyzer may get feedback from lower layer protocol indicating what was the acknowledge method used to transmit the packet.

This information may be provided back to the application over IP that may then determine the call session transfer status based on the importance of the current signaling, and may decide to retransmit already transmitted message once the handover is complete.

A call transfer may happen in a terminal, and the devices and methods provided may guarantee that different call controllers in the terminal are well aligned.

There may be two steps in a handover: the transfer from PS radio resource to CS (or in some particular case PS) radio resource, and the transfer of the call control from an application running over IP to a Circuit switch call controller.

Figure 9:
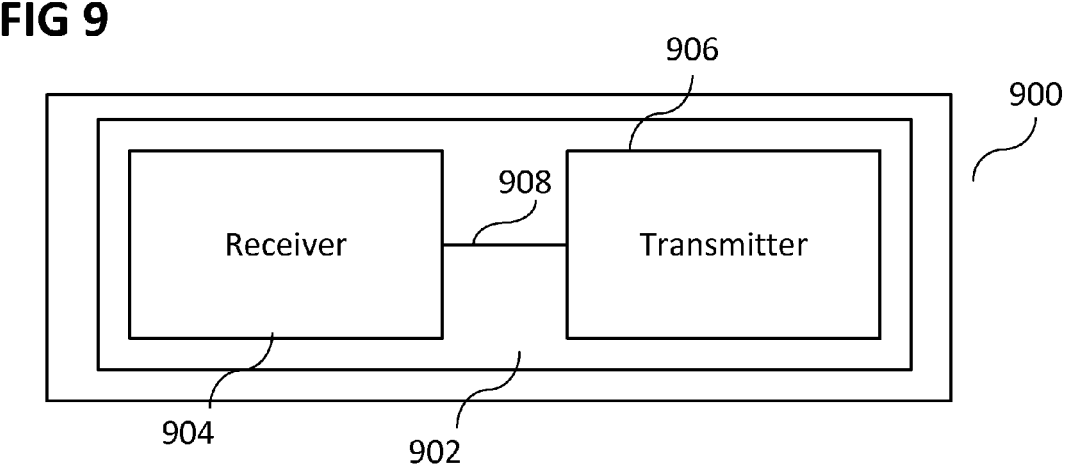
FIG. 9 shows a communication device including a protocol stack, wherein the protocol stack includes a receiver, a data transmitter, and a state transmitter.

FIG. 9 shows a communication device 900. The communication device 900 may include a protocol stack 902 of a communication protocol layer. The protocol stack 902 may include a receiver 904 configured to receive from a layer higher than the communication protocol layer an input signal. The protocol stack 902 may further include a transmitter 906 configured to transmit to another communication device (not shown) data based on the received input signal and configured to transmit to the higher layer information indicating a transmission state of the data. The receiver 904 and the transmitter 906 may be coupled with each other, for example via a connection 908, for example an optical connection or an electrical connection, such as for example a cable or a computer bus or via any other suitable electrical connection to exchange electrical signals.

The transmitter 906 may include: a data transmitter configured to transmit to the other communication device the data based on the received input signal; and a state transmitter configured to transmit to the higher layer the information indicating the transmission state of the data.

The data transmitter may transmit to an external communication device, while the state transmitter may transmit inside the communication device 900.

Two different applications may provide a same or similar service but may use two different session control protocols and also two different transmission protocols. In case of handover of the service from one application to another application, the state of the call session managed by the first application may be converted and provided to the second application in order for the second application to continue to provide the service with a second session controller and a second transmission protocol.

In order to accurately convert and provide the correct state information of the session controller from the first application to the second application, the first transmission protocol may provide accurate indication of the transmission of the data, in order that the first session controller may determine its current state.

For example, the state transmitter may provide both the feedback from the transmission protocol to the application (for example session controller) and consequently allow the accurate state conversion and transmission from the first application (for example the first controller) to the second application, for example the second call controller.

The protocol stack 902 may include or may be a cellular protocol stack.

The data transmitter may transmit the data to the other communication device using a layer lower than the communication protocol layer.

The information indicating the transmission state of the data may be information from which a state of a transmission of the data (for example "transmitted", "not yet transmitted", "transmitted reliably", "transmitted not reliably") may be derivable. The information indicating the transmission state of the data may include or may be at least one of an information indicating whether the data have been transmitted, an information indicating whether the data have been transmitted successfully, and indication indicating whether the data have reached their destination, and an indication indicating a reliability of the transmission method using which the data have been transmitted. The indication may be provided to a first communication service controller or to a second communication service controller (like will be described below), for example to the application controller (for example call controller).

The protocol stack of the communication protocol layer may include a buffer (not shown) configured to store the received input signal. A first communication service controller (and/or a second communication service controller, like will be described below; for example the application) and the protocol stack 902 may use a shared buffer to minimize the number of data copy between the different components. The data transmitter may transmit to the other communication device the data based on the buffered input signal.

The buffer may delete the buffered input signal after the data transmitter transmits to the other communication device the data based on the buffered input signal. The information indicating the transmission state of the data may include or may be data stored in the buffer. It will be understood that the information indicating the transmission state of the data may include the message itself, for example in case the analysis is done by the first communication service controller (and/or the second communication controller, for example the application); for example, the first communication service controller (and/or the second communication controller) instead of a control message analyzer (like will be described below, for example the IP analyzer) or the protocol stack 902 may do the analysis.

The signal may include or may be a control signal of a communication service, for example of a voice communication service, an audio communication service, a video communication service, or any other kind of communication service.

Figure 10:
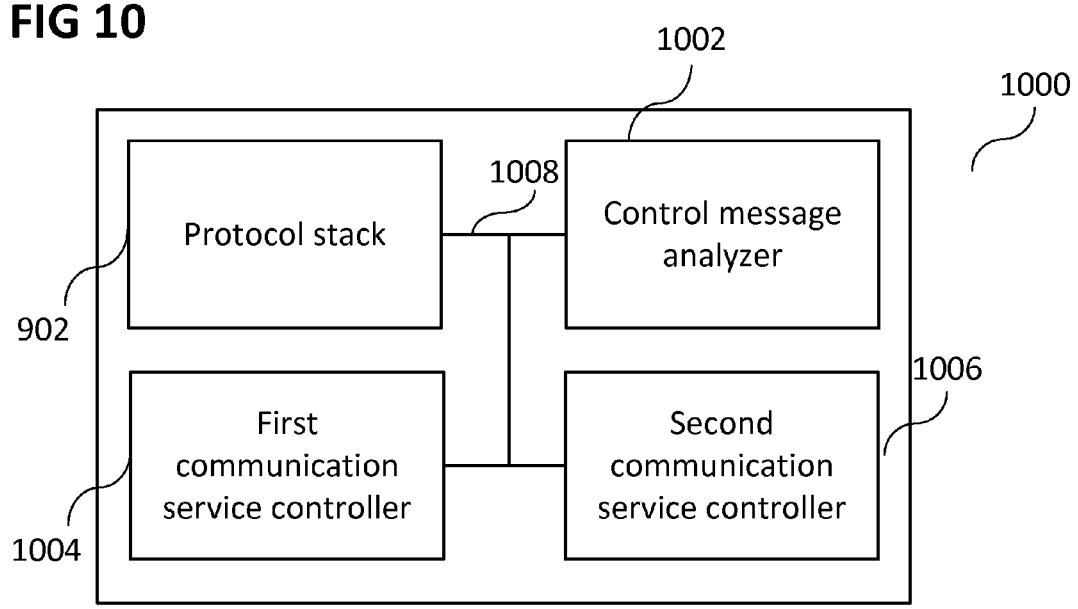
FIG. 10 illustrates a communication device including a protocol stack, a control message analyzer, a first communication service controller, and a second communication controller.

FIG. 10 shows a communication device 1000. The communication device 1000 may, similar to the communication device 900 of FIG. 9, include a protocol stack 902. The communication device 1000 may further include a control message analyzer 1002, like will be described below. The communication device 1000 may further include a first communication service controller 1004, like will be described below, and which may also be referred to as an application. The communication device 1000 may further include a second communication service controller 1006, like will be described below, and which may also be referred to as an application. The protocol stack 902, the control message analyzer 1002, the first communication service controller 1004, and the second communication service controller 1006 may be coupled with each other, for example via a connection 1008, for example an optical connection or an electrical connection, such as for example a cable or a computer bus or via any other suitable electrical connection to exchange electrical signals.

The control message analyzer 1002 may determine whether a control message for the communication service has been transmitted based on the information indicating a transmission state of the data.

For example, the control message analyzer 1002 (for example the IP analyzer) may detect a packet pending in the buffer and may then provide the data to the application/controller.

In another example, the control message analyzer 1002 (for example the IP analyzer) may search for signaling message based on filter or search pattern provided by the first communication service controller 1004 or the second communication service controller 1006 (for example application controller or call controller). This approach may be made generic to allow an application to configure a search pattern toward a control message analyzer 1002 (for example IP analyzer) and provide some criteria to be informed from the control message analyzer 1002 (for example IP analyzer) when the message is not successfully transmitted.

For example, the protocol stack may include or may be a cellular protocol stack, and the control message analyzer may be an IP analyzer, like described above.

The protocol stack 902 of the communication protocol layer may include the control message analyzer 1002.

The control message analyzer 1002 may be provided outside the protocol stack of the communication protocol layer.

The first communication service controller 1004 may control a communication service using a first communication technology. The second communication service controller 1006 may control a communication service using a second communication technology. The receiver 904 of the protocol stack 902 may receive the input signal from the first communication service controller 1004. In a handover of a communication service from the first communication technology to the second communication technology, the first communication service controller 1004 or the second communication service controller 1006 may determine a state of the communication service based on the information indicating the transmission state of the data. For example, the first communication service controller 1004 may get feedback from the control message analyzer 1002 (for example the IP analyzer) or the protocol stack 902 (for example the CPS) and then the first communication service controller 1004 may inform the second communication service controller 1006 about the appropriate call state. In other words, the first communication service may can determine the state based on the indication (for example from the control message analyzer 1002 (for example the IP analyzer)); then the synchronization regarding the session status between the first communication controller 1004 and the second communication controller 1006 may happen accurately The communication service may include or may be for example of a voice communication service, an audio communication service, a video communication service, or any other kind of communication service.

Figure 11:
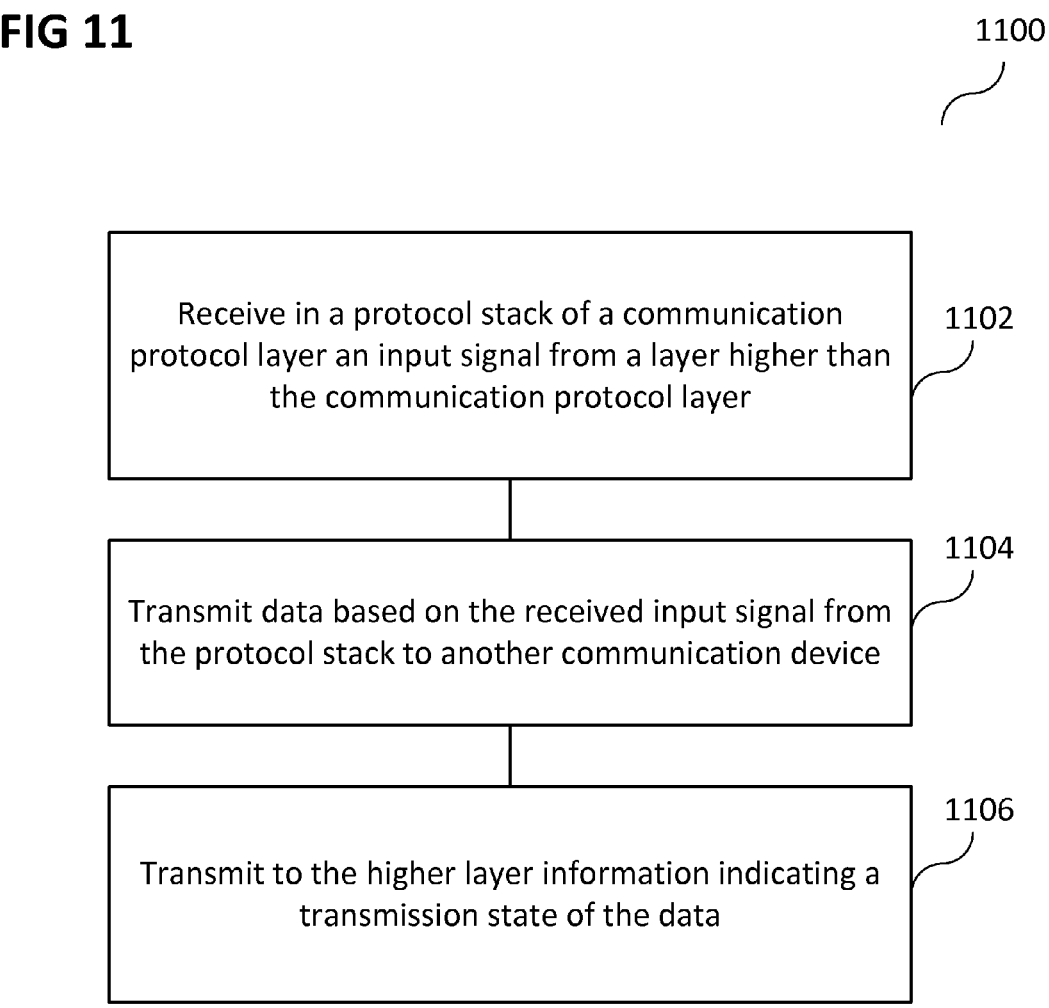
FIG. 11 shows a flow diagram illustrating a method for controlling a communication device, for example the communication device of FIG. 9.

FIG. 11 shows a flow diagram 1100 illustrating a method for controlling a communication device. In 1102, a protocol stack of a communication protocol layer may receive an input signal from a layer higher than the communication protocol layer. In 1104, the protocol stack of the communication device may transmit data based on the received input signal to another communication device. In 1106, the protocol stack may transmit to the higher layer information indicating a transmission state of the data.

The protocol stack may include or may be a cellular protocol stack.

The method may further include transmitting the data to the other communication device using a layer lower than the communication protocol layer.

The information indicating the transmission state of the data may be information from which a state of a transmission of the data (for example "transmitted", "not yet transmitted", "transmitted reliably", "transmitted not reliably") may be derivable. The information indicating the transmission state of the data may include or may be at least one of an information indicating whether the data have been transmitted, an information indicating whether the data have been transmitted successfully, and indication indicating whether the data have reached their destination, and an indication indicating a reliability of the transmission method using which the data have been transmitted.

A buffer of protocol stack of the communication protocol layer may store the received input signal. The method may further include transmitting the data to the other communication device based on the buffered input signal. The other communication device may be an external communication device, for example the communication device in communication, for example voice communication, with the communication device The buffer may delete the buffered input signal after the data transmitter transmits to the other communication device the data based on the buffered input signal. The information indicating the transmission state of the data may include or may be data stored in the buffer.

The signal may include or may be a control signal of a communication service, for example of a voice communication service, an audio communication service, a video communication service, or any other kind of session communication service.

The method may further include determining whether a control message for the communication service has been transmitted based on the information indicating a transmission state of the data.

The protocol stack of the communication protocol layer may determine whether a control message for the communication service has been transmitted. For this purpose, the protocol stack or the control message analyzer (for example the IP analyzer) may include a filter or search pattern (for example received from the application, for example the communication service, for example the voice communication service) in order to know how to identify the "control" message. For example by default, the protocol layer may not know the type of application message type being transmitted. If the message is not transmitted, to know if it is an application control message, either a search pattern may be provided from the application itself, or the message may be (for example directly) provided back to the application.

The method may further include: controlling a communication service using a first communication technology; controlling a communication service using a second communication technology; receiving the input signal from the first communication service controller; and in a handover of a communication service from the first communication technology to the second communication technology, determining a state of the communication service based on the information indicating the transmission state of the data.

The communication service may include or may be for example of a voice communication service, an audio communication service, a video communication service, or any other kind of session communication service.

Figure 12:
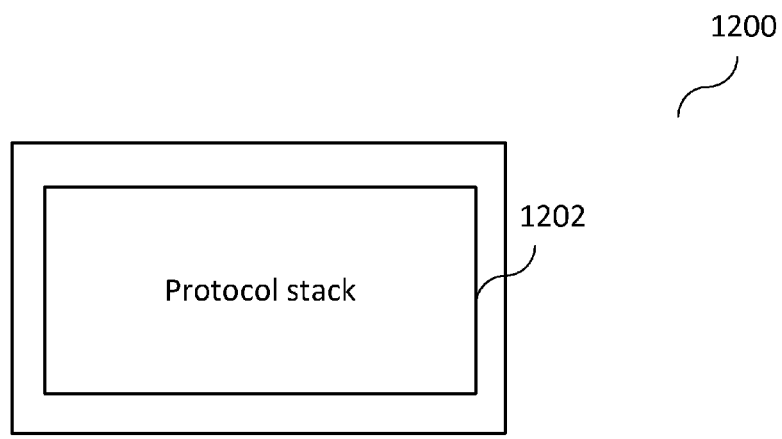
FIG. 12 shows a communication device including a protocol stack.

FIG. 12 shows a communication device 1200. The communication device 1200 may include a protocol stack 1202 of a communication protocol layer. The protocol stack 1202 may receive an input signal from a higher layer, configured to transmit data to another communication device based on the received input layer, and configured to transmit to the higher layer information indicating a transmission state of the data.

The information indicating the transmission state of the data may be information from which a state of a transmission of the data (for example "transmitted", "not yet transmitted", "transmitted reliably", "transmitted not reliably") may be derivable. The information indicating the transmission state of the data may include or may be at least one of an information indicating whether the data have been transmitted, an information indicating whether the data have been transmitted successfully, and indication indicating whether the data have reached their destination, and an indication indicating a reliability of the transmission method using which the data have been transmitted.

Figure 13:
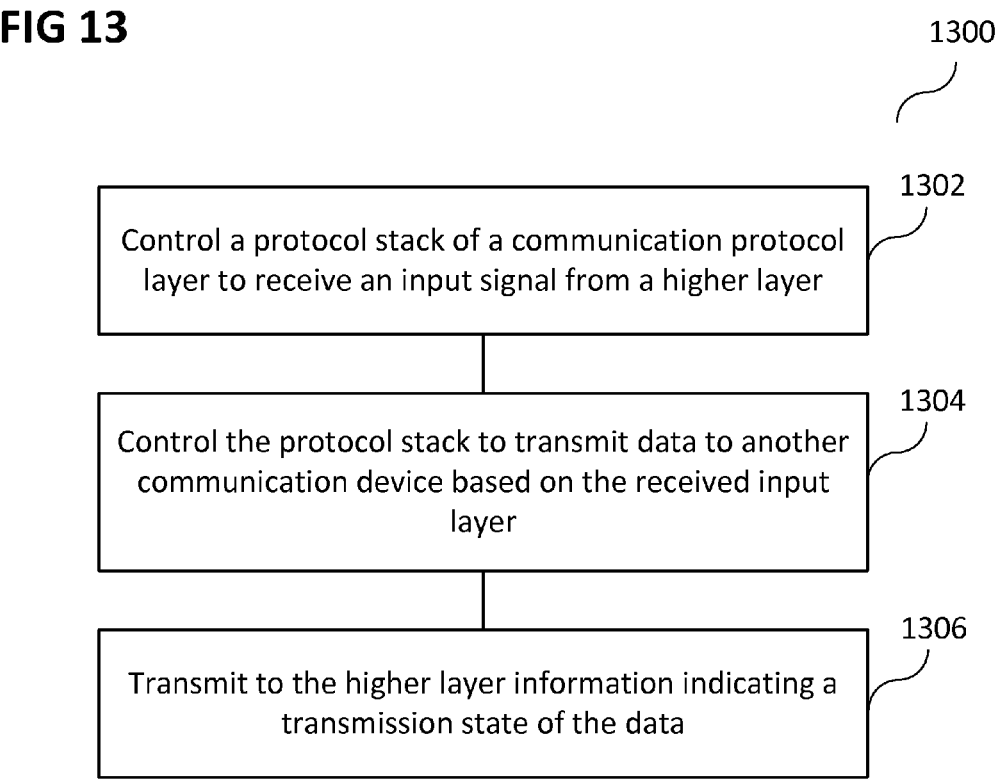
FIG. 13 shows a flow diagram illustrating a method for controlling a communication device, for example the communication device of FIG. 12.

FIG. 13 shows a flow diagram 1300 illustrating a method for controlling a radio communication device. In 1302, the radio communication device may control a protocol stack of a communication protocol layer to receive an input signal from a higher layer. In 1304, the radio communication device may control the protocol stack to transmit data to another communication device based on the received input layer. In 1306, the radio communication device may control the protocol stack to transmit to the higher layer information indicating a transmission state of the data.

The information indicating the transmission state of the data may be information from which a state of a transmission of the data (for example "transmitted", "not yet transmitted", "transmitted reliably", "transmitted not reliably") may be derivable. The information indicating the transmission state of the data may include or may be at least one of an information indicating whether the data have been transmitted, an information indicating whether the data have been transmitted successfully, and indication indicating whether the data have reached their destination, and an indication indicating a reliability of the transmission method using which the data have been transmitted.

Any one of the communication devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a protocol stack circuit of a communication protocol layer, the protocol stack circuit comprising:
        a buffer;
        a receiver configured to receive from a layer higher than the communication protocol layer an input signal; and
        a transmitter configured to transmit to another communication device data based on the received input signal and configured to transmit to the higher layer information indicating a transmission state of the data based on an identification of the input signal in the buffer that indicates that processing was interrupted at the communication protocol layer.

2. The communication device of claim 1,
    wherein the transmitter comprises:
        a data transmitter configured to transmit to the other communication device the data based on the received input signal; and
        a state transmitter configured to transmit to the higher layer the information indicating the transmission state of the data.

3. The communication device of claim 1,
    wherein the protocol stack circuit comprises a cellular protocol stack.

4. The communication device of claim 2,
    wherein the data transmitter transmits to the other communication device using a layer lower than the communication protocol layer.

5. The communication device of claim 1,
    wherein the information indicating the transmission state of the data comprises at least one of an information indicating whether the data have been transmitted, an information indicating whether the data have been transmitted successfully, and indication indicating whether the data have reached their destination, and an indication indicating a reliability of the transmission method using which the data have been transmitted.

6. The communication device of claim 2,
    wherein the buffer is configured to store the received input signal;
    wherein the data transmitter transmits to the other communication device the data based on the buffered input signal.

7. The communication device of claim 6,
    wherein the buffer deletes the buffered input signal after the data transmitter transmits to the other communication device the data based on the buffered input signal, and
    wherein the information indicating the transmission state of the data comprises data stored in the buffer.

8. The communication device of claim 1,
    wherein the signal comprises a control signal of a communication service.

9. The communication device of claim 8, further comprising:
    a control message analyzer configured to determine whether a control message for the communication service has been transmitted based on the information indicating a transmission state of the data.

10. The communication device of claim 9,
    wherein the protocol stack circuit of the communication protocol layer comprises the control message analyzer.

11. The communication device of claim 9,
    wherein the control message analyzer is provided outside the protocol stack circuit of the communication protocol layer.

12. The communication device of claim 1, further comprising:
    a first communication service controller configured to control a communication service using a first communication technology;
    a second communication service controller configured to control a communication service using a second communication technology;
    wherein the receiver receives the input signal from the first communication service controller;
    wherein in a handover of a communication service from the first communication technology to the second communication technology, at least one of the first communication service controller or the second communication service controller determines a state of the communication service based on the information indicating the transmission state of the data.

13. A method for controlling a communication device, the method comprising:
    receiving in a protocol stack circuit of a communication protocol layer an input signal from a layer higher than the communication protocol layer;
    transmitting data based on the received input signal from the protocol stack circuit to another communication device; and
    transmitting to the higher layer information indicating a transmission state of the data based on an identification of the input signal in a buffer of the protocol stack circuit of the communication protocol layer that indicates that processing was interrupted at the communication protocol layer.

14. The method of claim 13,
    wherein the protocol stack circuit comprises a cellular protocol stack.

15. The method of claim 13, further comprising:
    transmitting the data to the other communication device using a layer lower than the communication protocol layer.

16. The method of claim 13,
    wherein the information indicating the transmission state of the data comprises at least one of an information indicating whether the data have been transmitted, an information indicating whether the data have been transmitted successfully, and indication indicating whether the data have reached their destination, and an indication indicating a reliability of the transmission method using which the data have been transmitted.

17. The method of claim 13,
wherein the buffer stores the received input signal;
the method further comprising transmitting the data to the other communication device based on the buffered input signal.

18. The method of claim 17,
wherein the buffer deletes the buffered input signal after the data transmitter transmits to the other communication device the data based on the buffered input signal, and
wherein the information indicating the transmission state of the data comprises data stored in the buffer.

19. The method of claim 13,
wherein the signal comprises a control signal of a communication service.

20. The method of claim 19, further comprising:
determining whether a control message for the communication service has been transmitted based on the information indicating a transmission state of the data.

21. The method of claim 13,
wherein the protocol stack circuit of the communication protocol layer determines whether a control message for the communication service has been transmitted.

22. A communication device comprising:
a protocol stack circuit of a communication protocol layer, the protocol stack circuit configured to receive an input signal from a higher layer, configured to transmit data to another communication device based on the received input signal, and configured to transmit to the higher layer information indicating a transmission state of the data based on an identification of the input signal in a buffer of the protocol stack circuit of the communication protocol layer that indicates that processing was interrupted at the communication protocol layer.

23. The communication device of claim 22,
wherein the information indicating the transmission state of the data comprises at least one of an information indicating whether the data have been transmitted, an information indicating whether the data have been transmitted successfully, and indication indicating whether the data have reached their destination, and an indication indicating a reliability of the transmission method using which the data have been transmitted.

24. A method for controlling a communication device, the method comprising:
controlling a protocol stack circuit of a communication protocol layer to receive an input signal from a higher layer;
controlling the protocol stack circuit to transmit data to another communication device based on the received input layer; and
transmitting to the higher layer information indicating a transmission state of the data based on an identification of the input signal in a buffer of the protocol stack circuit of the communication protocol layer that indicates that processing was interrupted at the communication protocol layer.

25. The method of claim 24,
wherein the information indicating the transmission state of the data comprises at least one of an information indicating whether the data have been transmitted, an information indicating whether the data have been transmitted successfully, and indication indicating whether the data have reached their destination, and an indication indicating a reliability of the transmission method using which the data have been transmitted.

* * * * *